(12) United States Patent
Barker et al.

(10) Patent No.: US 12,356,884 B2
(45) Date of Patent: Jul. 15, 2025

(54) PLANTER HAVING A SEEDING SYSTEM

(71) Applicant: DEERE & COMPANY, Moline, IL (US)

(72) Inventors: Mark E. Barker, Johnston, IA (US); Noel W. Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 696 days.

(21) Appl. No.: 17/743,082

(22) Filed: May 12, 2022

(65) Prior Publication Data

US 2023/0363304 A1      Nov. 16, 2023

(51) Int. Cl.
*A01C 7/10*     (2006.01)
*A01C 7/16*     (2006.01)

(52) U.S. Cl.
CPC ............. *A01C 7/105* (2013.01); *A01C 7/16* (2013.01)

(58) Field of Classification Search
CPC ............ A01C 7/102; A01C 7/105; A01C 7/16
USPC ................................................ 111/170, 171
See application file for complete search history.

(56) References Cited

U.S. PATENT DOCUMENTS

| | | | |
|---|---|---|---|
| 3,648,631 A * | 3/1972 | Fiedler et al. | A01C 7/06 222/623 |
| 3,815,525 A * | 6/1974 | Kainson et al. | A01C 23/026 111/127 |
| 4,444,130 A * | 4/1984 | Ray | A01C 5/045 111/926 |
| 4,614,160 A * | 9/1986 | Curlett | A01C 5/02 111/96 |
| 5,794,550 A | 8/1998 | Chadwick | |
| 2005/0241553 A1 * | 11/2005 | Dika | A01C 7/18 111/170 |
| 2020/0000012 A1 * | 1/2020 | Hubner et al. | A01C 7/102 |
| 2020/0128724 A1 * | 4/2020 | Stoller et al. | A01C 7/06 |
| 2021/0298227 A1 * | 9/2021 | Unruh | A01C 11/04 |

(Continued)

FOREIGN PATENT DOCUMENTS

| | | | |
|---|---|---|---|
| DE | 102021125691 A1 | 4/2022 | |
| EP | 3586584 A1 * | 1/2020 | A01C 7/042 |

OTHER PUBLICATIONS

German Search Report issued in application No. DE102023107688.4 dated Oct. 9, 2023 (12 pages including English machine translation).

*Primary Examiner* — Tara Mayo
(74) *Attorney, Agent, or Firm* — Michael Best & Friedrich LLP

(57) ABSTRACT

A seeding machine moves over the ground and includes a frame, at least one hopper containing seeds to be planted and planting row units connected to the frame. Each of the row units includes a seed metering device that separates and guides individual seeds into a planting position, and a shaft that reciprocates with respect to the frame through a stroke path. The stroke path includes extension towards the ground to a lowered position and retraction away from the ground to a raised position. The shaft engages one of the seeds from the planting position while the shaft is near the raised position. The shaft moves the one of the seeds downward while the shaft extends toward the ground to create an opening in the ground by pressing the one of the seeds into ground while the shaft is near the lowered position.

13 Claims, 12 Drawing Sheets

(56) References Cited

U.S. PATENT DOCUMENTS

2022/0124966 A1  4/2022  Barker
2022/0167551 A1  6/2022  Anderson et al.

* cited by examiner

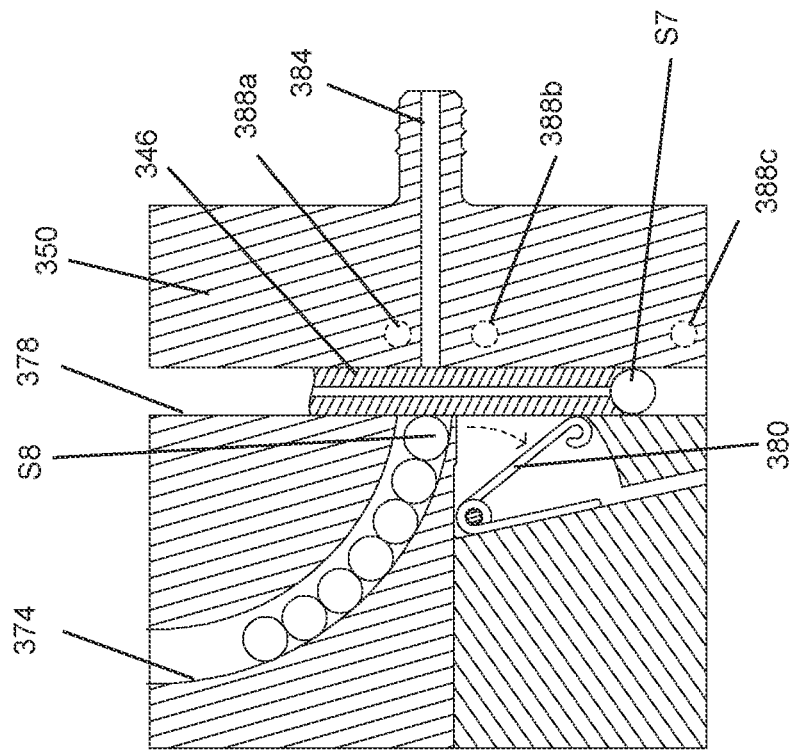
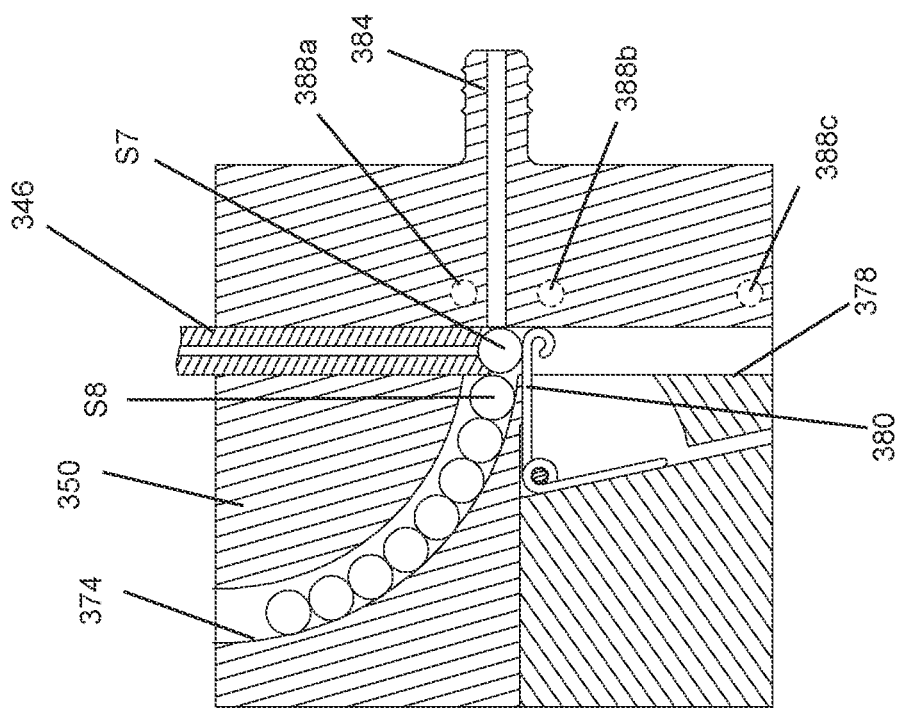
FIG. 10
FIG. 9

PLANTER HAVING A SEEDING SYSTEM

BACKGROUND

The present disclosure relates to a seeding machine having a seed delivery system for delivering seed from a hopper to the ground.

An agricultural seeding machine such as a row crop planter typically forms a plurality of parallel seed trenches in the soil using a furrow opening disc and places seeds at a desired depth within the trenches. The furrow opening discs require a large amount of force to create the trenches especially when the machine is moving at high speeds and in more compacted soils. Additionally, the structure of the furrow opening discs is such that a large minimum distance is required between the rows.

SUMMARY

In one aspect, the disclosure provides a planter for planting seeds in the ground. The planter includes a frame, a seed metering device that separates and guides individual seeds into a planting position and a shaft that reciprocates with respect to the frame through a stroke path. The stroke path includes extension towards the ground to a lowered position and retraction away from the ground to a raised position. The shaft engages one of the seeds from the planting position while the shaft is near the raised position. The shaft moves the one of the seeds downward while the shaft extends toward the ground, to create an opening in the ground by inserting the one of the seeds into ground while the shaft is near the lowered position.

In another aspect, the disclosure provides a seeding machine that moves over the ground. The seeding machine includes a frame, at least one hopper containing seeds to be planted and planting row units connected to the frame. Each of the row units includes a seed metering device that separates and guides individual seeds into a planting position, and a shaft that reciprocates with respect to the frame through a stroke path. The stroke path includes extension towards the ground to a lowered position and retraction away from the ground to a raised position. The shaft engages one of the seeds from the planting position while the shaft is near the raised position. The shaft moves the one of the seeds downward while the shaft extends toward the ground to create an opening in the ground by pressing the one of the seeds into ground while the shaft is near the lowered position.

In yet another aspect, the disclosure provides a method of planting seeds in the ground. The method includes metering seeds to dispense one seed at a time, and reciprocating a shaft through a stroke path including extension towards the ground to a lowered position and retraction away from the ground surface to a raised position. The method further includes engaging one of the seeds with the shaft while the shaft is near the raised position, moving the one of the seeds toward the ground with the shaft, and piercing a ground surface with the seed while the shaft is near the lowered position to thereby plant the one of the seeds in the ground.

In still another aspect, the disclosure provides a control system for a seeding machine that includes a frame, a hopper configured to retain seeds, and a seed metering device. The seed metering devices has a drive member, an endless member, and a reciprocating shaft. The drive member moves the endless member about the drive member. The reciprocating shaft reciprocates with respect to the frame through a stroke path including extension towards the ground to a lowered position and retraction away from the ground to a raised position. The shaft engages one of the seeds from the endless member while the shaft is near the raised position, moves the one of the seeds downward while the shaft extends toward the ground, and presses the one of the seeds into ground to thereby create an opening in the ground while the shaft is near the lowered position. The control system includes a first sensor that senses a travel speed of the seeding machine, a second sensor that senses a position of a seed on the endless member, and a controller in electrical communication with the first sensor and the second sensor. The controller receives a first signal from the first sensor and receive a second signal from the second sensor. The first signal is indicative of the travel speed of the seeding machine, and the second signal is indicative of the position of the seeds on the endless member. The controller sends a third signal to the shaft to cause the reciprocation frequency of the reciprocating shaft to be adjusted in response to the first and second signals. The controller also sends a fourth signal to the drive member to cause the speed of movement of the endless member to be adjusted in response to the first and second signals.

Other features and aspects of the disclosure will become apparent by consideration of the following detailed description and accompanying drawings.

BRIEF DESCRIPTION OF THE DRAWINGS

FIG. 9 is a close-up cross-sectional view of yet another metering device with the shaft is a raised position.

FIG. 10 is a close-up cross-sectional view of the metering device of FIG. 9 with the shaft in a partially lowered position.

Before any implementations of the disclosure are explained in detail, it is to be understood that the disclosure is not limited in its application to the details of construction and the arrangement of components set forth in the following description or illustrated in the following drawings. The disclosure is capable of supporting other implementations and of being practiced or of being carried out in various ways. Also, it is to be understood that the phraseology and terminology used herein is for the purpose of description and should not be regarded as limiting. The terms "up", "down", and the like may be used herein and should be understood to mean with respect to the ground.

DETAILED DESCRIPTION

Figure 1:
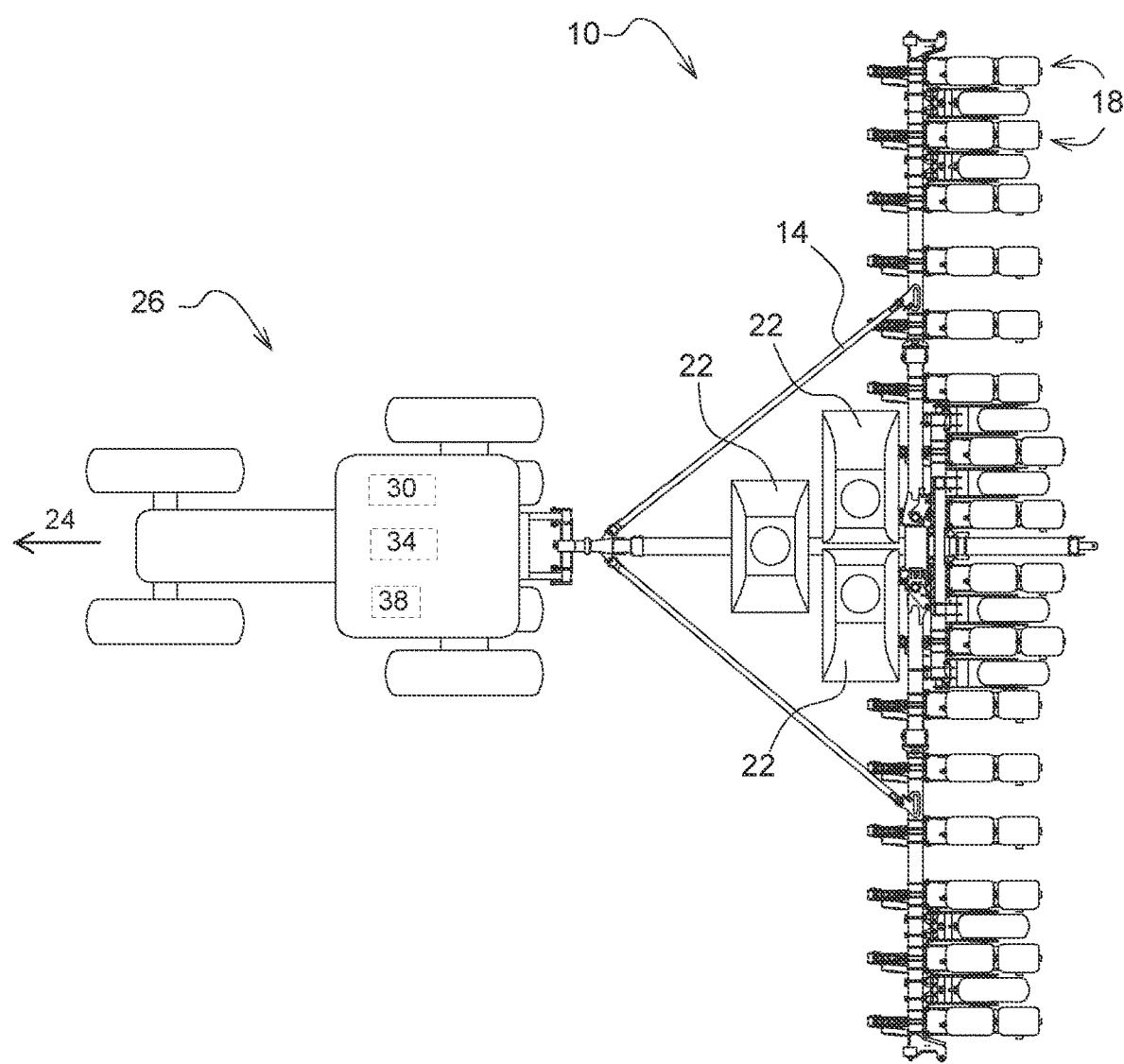
FIG. 1 is a top schematic view of a tractor and a planter having a plurality of row units.
Figure 2:
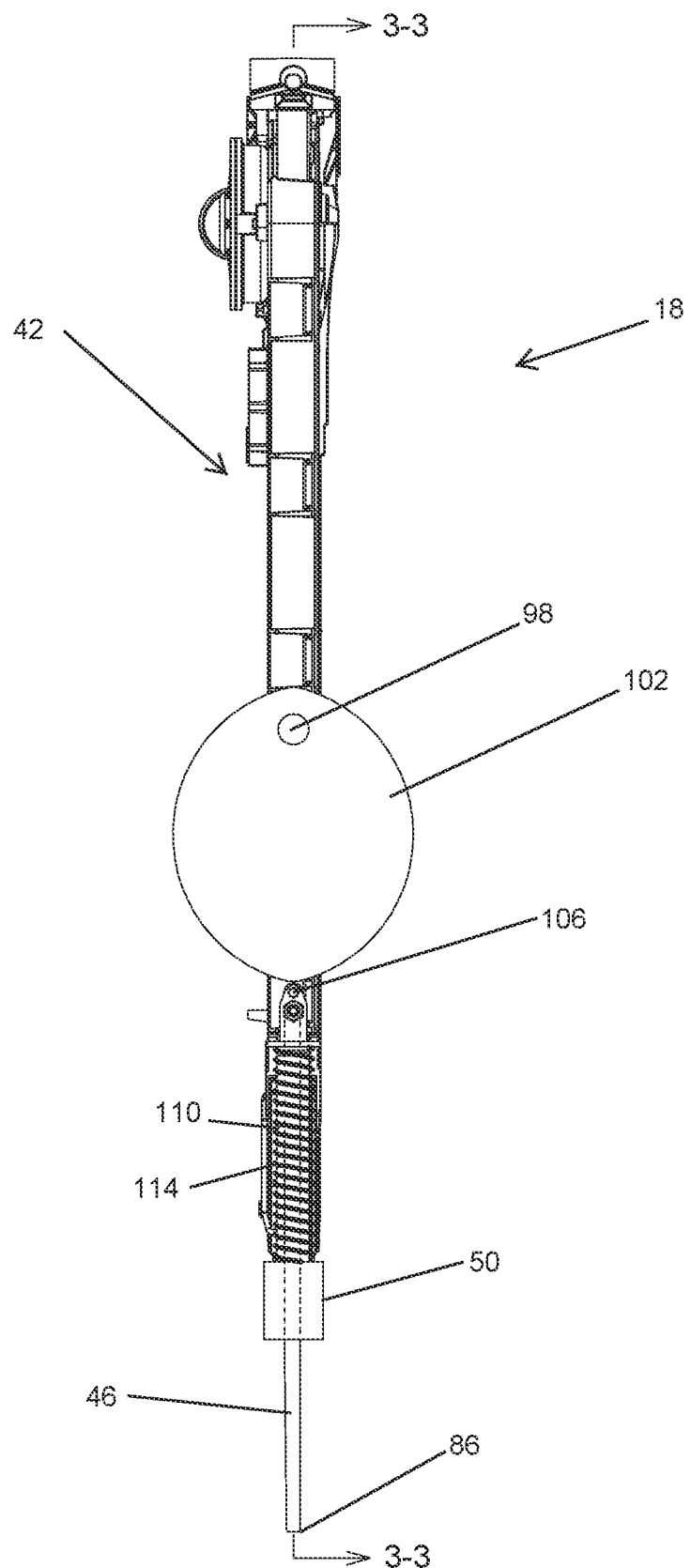
FIG. 2 is a front view of a seed metering device with a shaft in a lowered position.

With reference to FIG. 1 a planter 10 (which may also be referred to as a seeding machine) is shown. The planter 10 includes a planter frame 14. A plurality of planting row units 18 are mounted to the planter frame 14. Mounted to the planter frame 14 are one or more hoppers 22 containing seeds to be planted. In some implementations the seeds are all the same. In other implementations, the seeds may be different by hopper 22 and may be planted differently by row or by location within a row.

A single row of planting row units 18 is illustrated in FIG. 1. In some embodiments, only a single planting row unit 18 is utilized. In some embodiments, the planting row units 18 are arranged in a first row and a second row positioned behind the first row in a direction of travel 24. In some embodiments, each of the planting row units 18 in the second row is positioned directly behind a respective planting row unit 18 of the first row. This configuration would increase the potential planting speed since two planting row units 18 would be used in coordination. In other embodiments, each of the planting row units 18 in the second row is behind the first row between adjacent planting row units 18 of the first row. This configuration would permit planting of narrower rows. In some configurations, one type of seed could be planted by the first row whereas a different type of seed could be planted by the second row. In still other configurations, more than two rows of planting row units 18 are utilized.

The planter 10 is selectively coupled to a vehicle 26, such as a tractor, to be pulled across a ground surface. The vehicle 26 includes a user interface 30, a controller 34 and a travel speed sensor 38. The user interface 30 can be engaged by a user to set various parameters, such as a desired seed population (e.g., plants per acre, plants per hectare), and type of seed being planted. The population of plants is used with row spacing to determine plant spacing parameters such as row width, and/or seed spacing within row. The seed spacing may be entered by a user or may be entered as a correlated parameter such as population which is used with row spacing to calculate the seed spacing.

The user interface 30 may be located on-board vehicle 26, off-board vehicle 26, or both. The controller 34 is in electrical communication with the user interface 30. The travel speed sensor 38 senses a travel speed of the vehicle 26 and communicates the sensed speed to the controller 34. In some examples, the vehicle 26 and planter 14 may be integrated into a single self-propelled unit. In some examples, vehicle 26 may be autonomous or semi-autonomous.

FIGS. 2-5 illustrate one of the planting row units 18 in detail. The illustrated planting row unit 18 includes a seed metering device 42, a reciprocating shaft 46 and a seed guide 50. The seed metering device 42 (shown most clearly in FIGS. 3 and 5) includes a first rotating member 54, a second rotating member 58, an endless member 62, a seed input port 66, a seed sensor 70, and an endless member sensor 72.

At least one of the first rotating member 54 and the second rotating member 58 is a drive member. In some instances, both the first rotating member 54 and the second rotating member 58 are drive members. In other instances, one of the first rotating member 54 and the second rotating member 58 is a drive member and the other is an idler member.

The endless member 62 extends around the first and second rotating members 54, 58 and is moved about the first and second rotating members 54, 58 in response to rotation of the first and second rotating members 54, 58. The endless member 62 is flexible and includes seed-engaging elements, such as brushes, to separate individual seeds and move individual seeds toward the seed guide 50.

The seed input port 66 receives seeds from one of the hoppers 22 via a seed delivery system and delivers seed to the endless member 62. The endless member 62 collects seeds from the seed input port 66, separates individual seeds and moves the individual seeds toward the seed guide 50.

Figure 5:
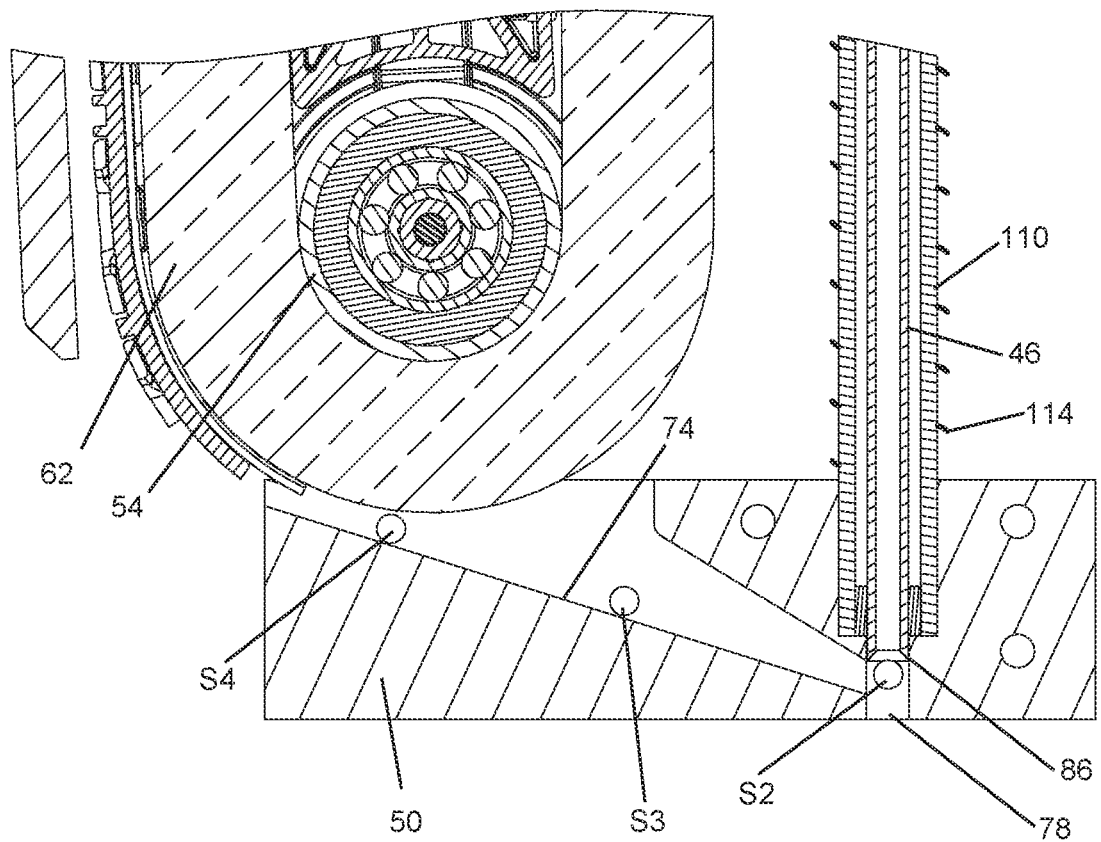
FIG. 5 is a close-up side view of a portion of the seed metering device indicated by circle A of FIG. 3 with the shaft in a raised position.

With reference to FIG. 5, the seed sensor 70 is configured to sense the proximate or presence of individual seeds on or near the endless member 62. The illustrated seed sensor 70 is positioned near an upper portion of the endless member 62, but the seed sensor 70 could be positioned in other positions. The seed sensor 70 could be any suitable sensor capable of sensing the position of a seed and communicating the sensed position to the controller 34.

The endless member sensor 72 is configured to sense one or more parameters indicative of a speed of the endless member 62. For example, the endless member sensor 72 can be configured to sense a linear speed of the endless member 62, to sense a rotational speed of one of the rotating members 54, 58, and/or to sense a time interval between dispensed seeds. The endless member sensor 72 is configured to communicate the sensed parameter(s) with the controller 34. In embodiments that sense the rotational speed of one of the rotating members 54, 58 the controller 34 is configured to calculate the linear speed of movement of the endless member 62 based upon the sensed rotational speed. In embodiments that to sense a time interval between dispensed seeds, the controller 34 can then determine the desired speed of the endless member 62, among other factors, to achieve a predetermined target seed spacing.

Figure 3:
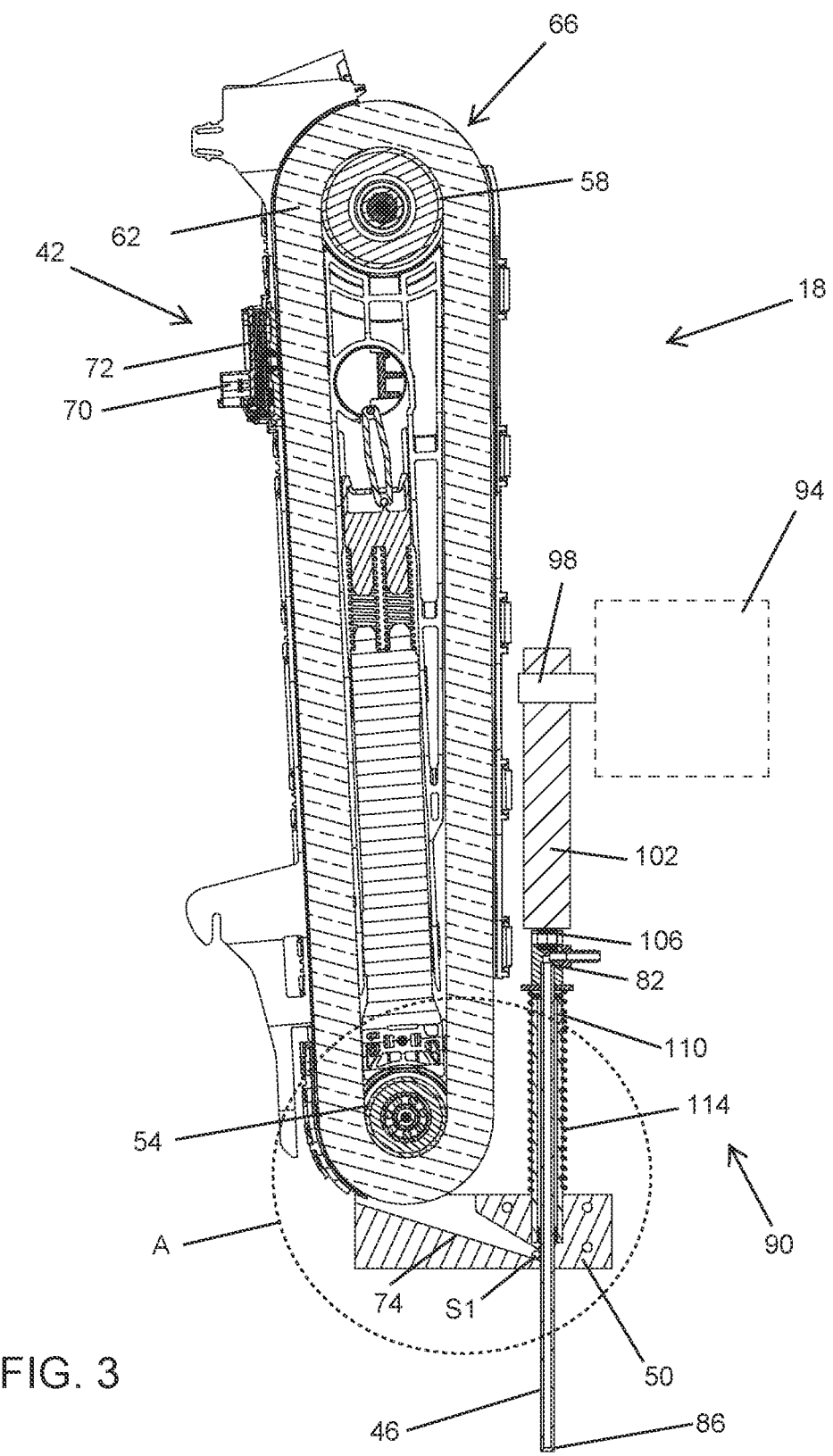
FIG. 3 is a cross-sectional view of the seed metering device of FIG. 2 taken alone line 3-3 of FIG. 2 with a shaft in a lowered position.

With reference to FIGS. 3 and 5, the seed guide 50 includes an inclined surface 74 and a bore hole 78. The inclined surface 74 includes a first end that is proximate the lower portion of the endless member 62 to received seeds from the endless member 62 (i.e., under the force of gravity). The inclined surface 74 also includes a second end that fluidly connects with the bore hole 78. The inclined surface 74 slopes downward from the first end to the second end to guide seeds received from the endless member 62 to the bore hole 78.

The illustrated bore hole 78 is sized to receive the reciprocating shaft 46 as well as one of the seeds. FIG. 3 illustrates a first seed S1 abutting the reciprocating shaft 46. The first seed S1 is blocked from entering the bore hole 78 by the reciprocating shaft 46. In response to upward movement of the reciprocating shaft 46 within the bore hole 78, the first seed S1 would be permitted to enter the bore hole 78.

FIG. 5 illustrates second, third and fourth seeds S2, S3, S4. The second seed S2 is positioned in the bore hole 78 and is ready to be planted in a ground surface. The second seed S2 is in the planting position. The third seed S3 is in a middle portion of the inclined surface 74 between the endless member 62 and the bore hole 78. The fourth seed S4 is on the inclined surface 74 proximate the endless member 62. The spacing between the seeds S2, S3 and S4 can be controlled by adjusting a speed of movement of the endless member 62 and by any seed metering mechanism that is upstream of the seed metering device 42.

With continued reference to FIGS. 2-5, the reciprocating shaft 46 is an elongate, hollow shaft with an upper portion 82 and a lower portion 86. The first portion 82 is coupled to a drive mechanism 90 and the second portion 86 is a free end.

The illustrated drive mechanism 90 includes a motor 94, a cam shaft 98, a cam 102, a cam follower 106, a sleeve 110 and a spring 114. The motor 94 rotates the cam shaft 98 which in turn rotates the cam 102. The cam follower 106 abuts the cam 102 and moves along a perimeter of the cam 102 during rotation of the cam 102. In other examples, drive mechanism 90 may be replaced by another rotation-to-linear motion drive mechanism or by a direct linear motion drive such as a solenoid.

The cam follower 106 is coupled to an upper portion 82 of the reciprocating shaft 46. Movement of the cam follower 106 in response to rotation of the cam 102 moves the reciprocating shaft 46 vertically. The sleeve 110 is coupled to the seed guide 50 and extends upward therefrom. The sleeve 110 is sized to receive the reciprocating shaft 46 and to permit vertical movement of the reciprocating shaft 46 within the sleeve 110.

The illustrated spring 114 is a coil spring that encircles the sleeve 110. The spring 114 abuts a portion of the seed guide 50 and a portion of the cam follower 106. The spring 114 biases the cam follower 106 upward into abutment with the cam 102.

Figure 4:
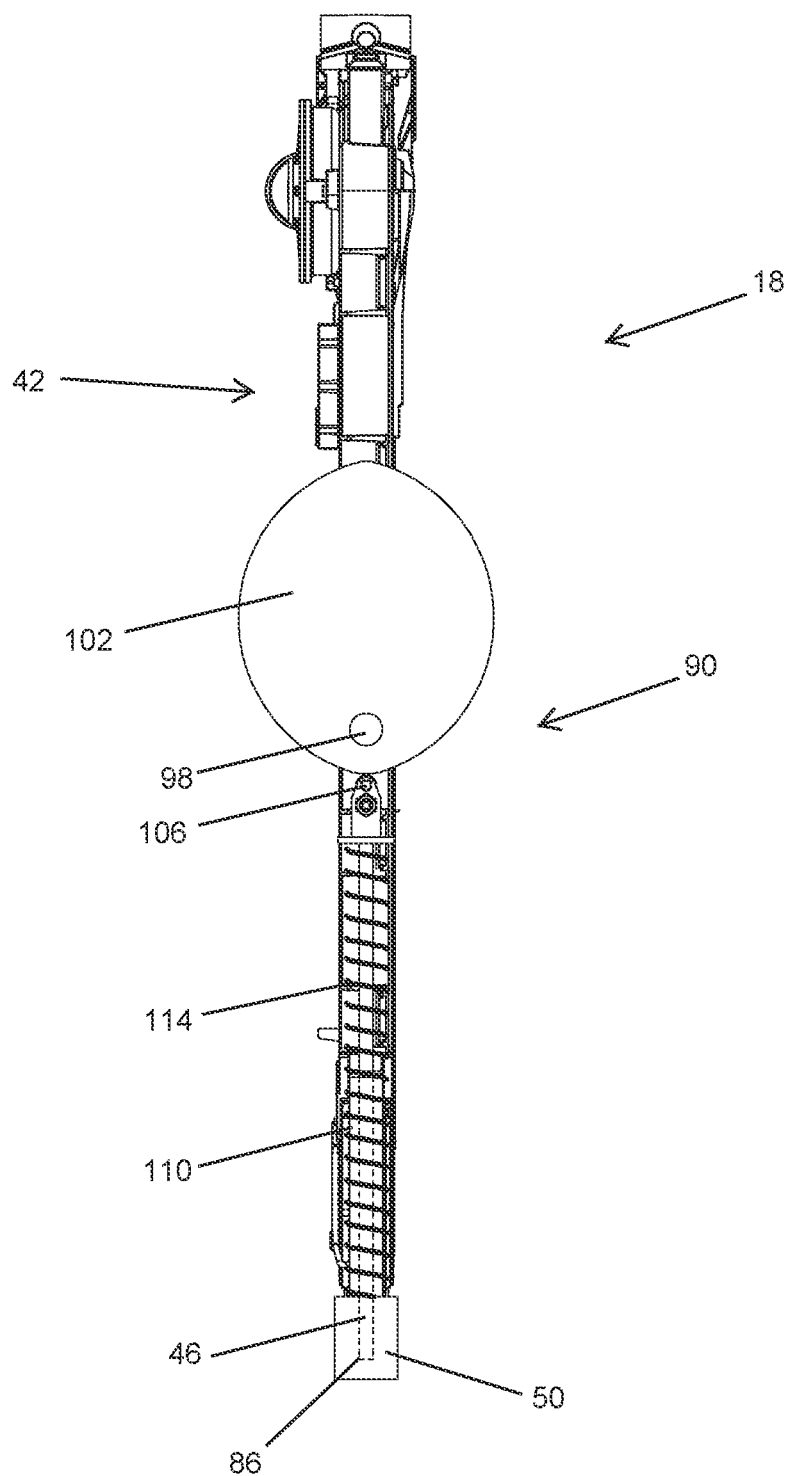
FIG. 4 is a front view of the seed metering device of FIG. 2 with the shaft in a raised position.

The reciprocating shaft 46 reciprocates vertically with respect to the frame 14 through a stroke path including extension towards the ground to a lowered position (shown in FIGS. 2 and 3) and retraction away from the ground to a raised position (shown in FIGS. 4 and 5). As shown in FIG. 5, while the reciprocating shaft 46 is near the raised position, the reciprocating shaft 46 engages a seed (i.e., the second seed S2) from the planting position in the bore hole 78. The reciprocating shaft 46 is moved downward in response to the drive mechanism 90 to move the seed downward while the reciprocating shaft 46 extends toward the ground. The reciprocating shaft 46 and seed pierce the ground to create an opening in the ground. The reciprocating shaft 46 inserts the seed into ground to plant the seed while the reciprocating shaft 46 is near the lowered position.

Figure 6:
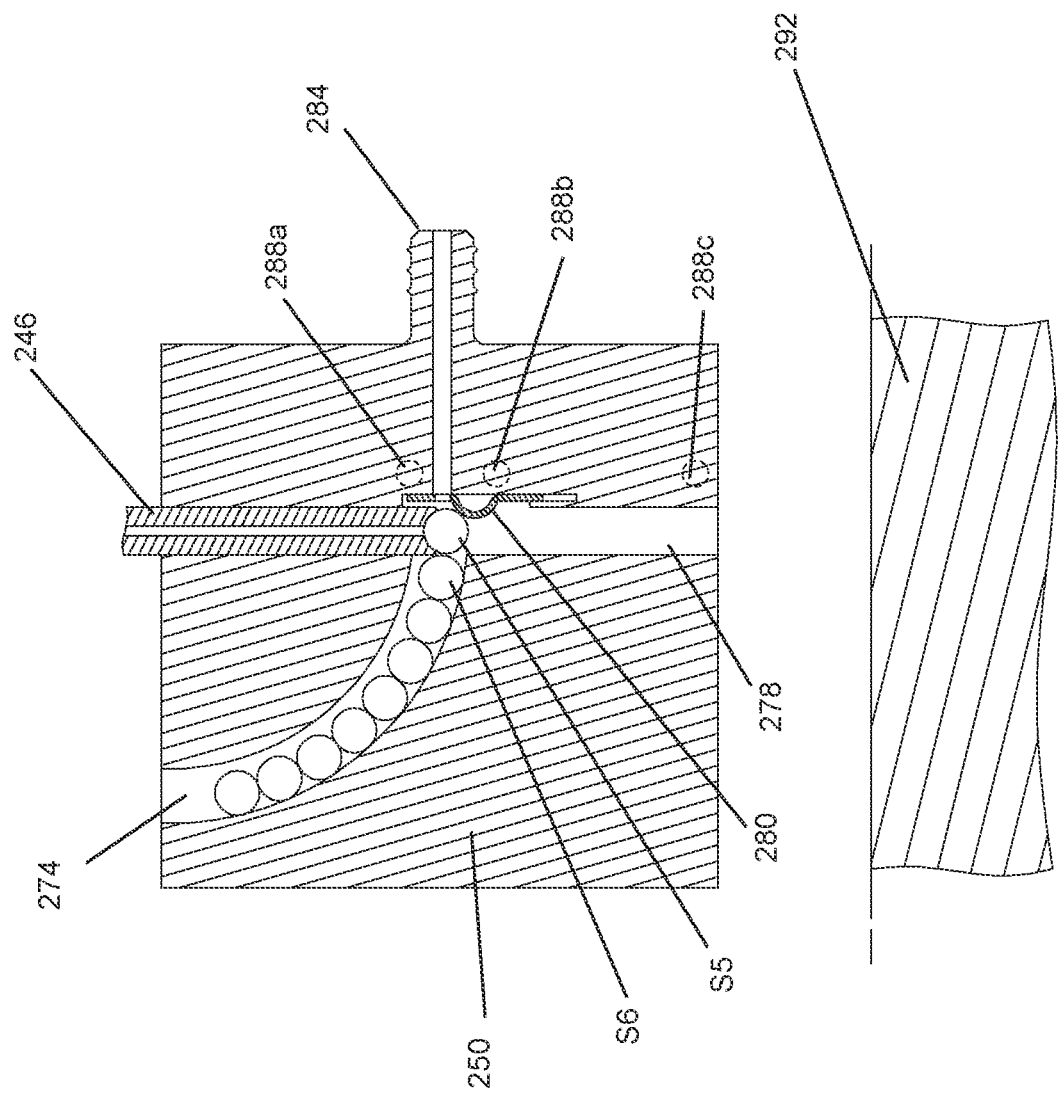
FIG. 6 is a close-up cross-sectional view of an alternative metering device with the shaft in a raised position.
Figure 8:
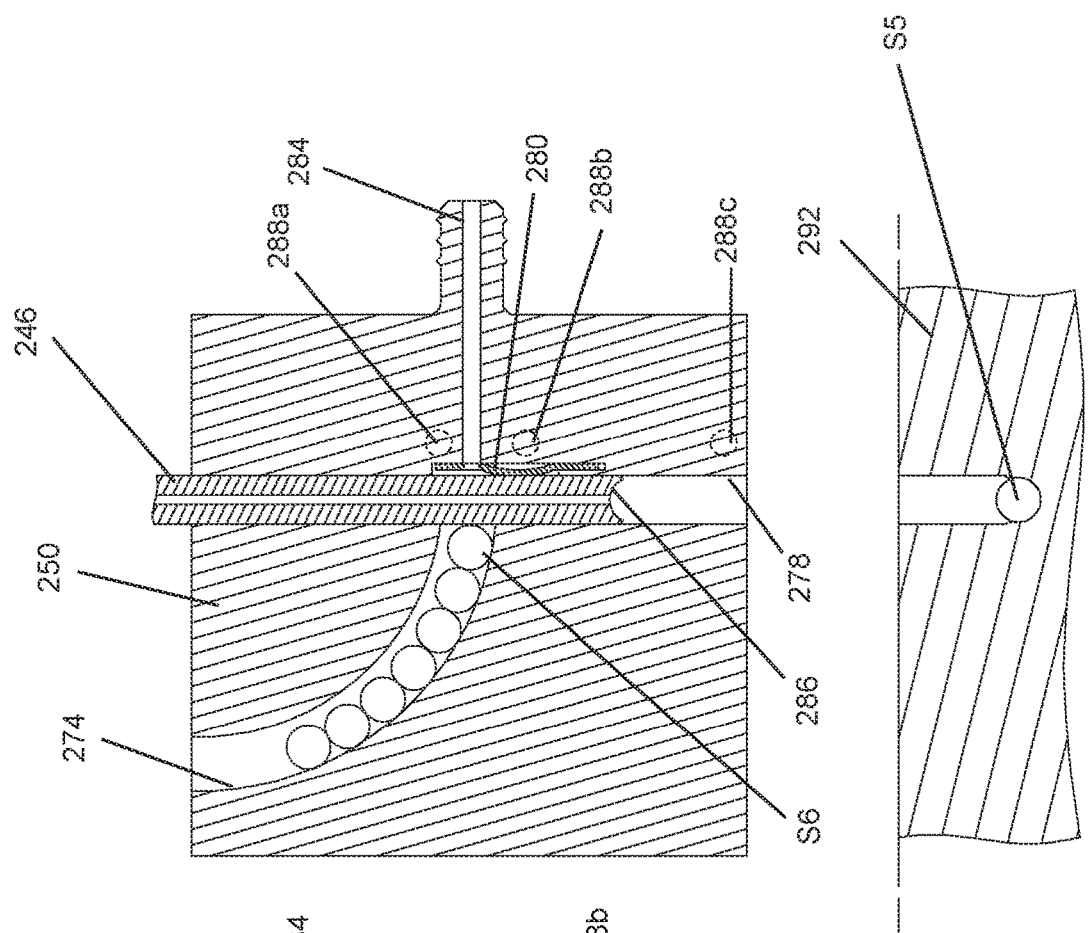
FIG. 8 is a close-up cross-sectional view of the metering device of FIG. 6 with the shaft in a partially raised position after a seed has been planted.
Figure 7:
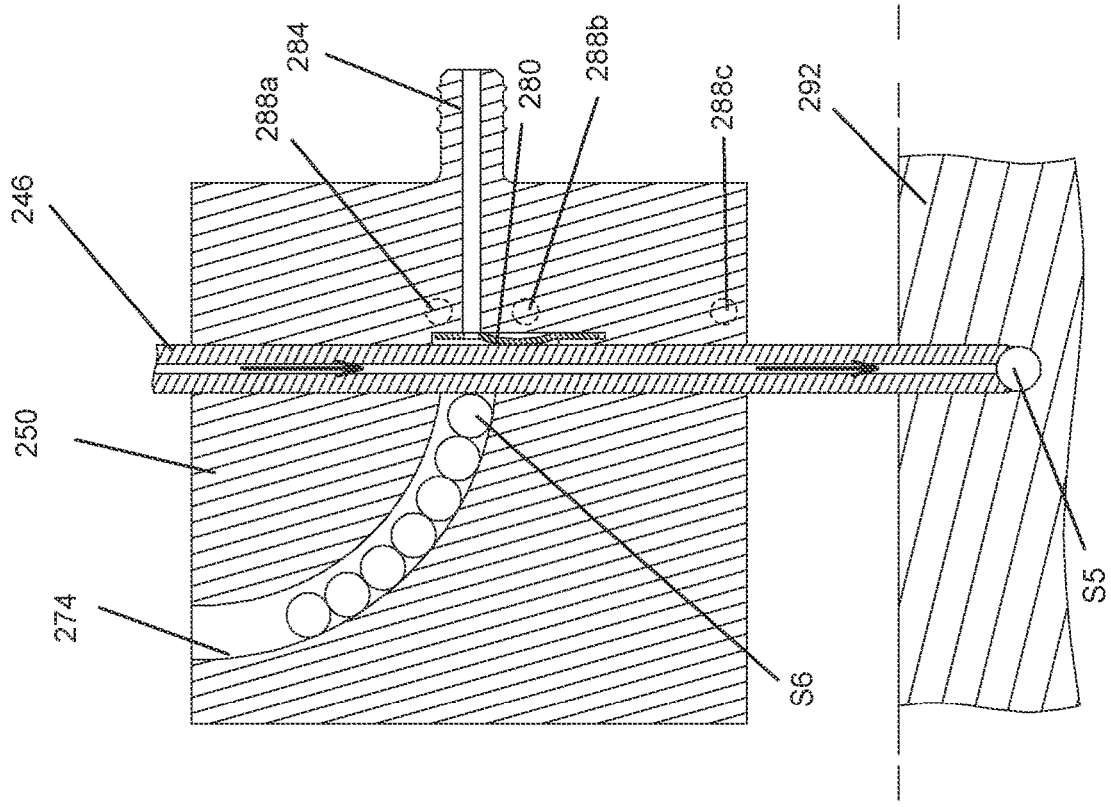
FIG. 7 is a close-up cross-sectional view of the metering device of FIG. 6 with the shaft in a lowered position while a seed is being planted.

FIGS. 6-8 illustrate an alternative configuration of a seed guide 250. The seed guide 250 can be used in place of the seed guide 50 described above with respect to FIGS. 2-5. The seed guide 250 includes a curved channel 274, a bore hole 278, a seed retainer 280, a vacuum port 284 and fluid ports 288a, 288b, 288c and is positioned above the ground 292. The curved channel 274 includes a first portion configured to receive seeds and a second portion that is fluidly coupled to the bore hole 278. The curved channel 274 is sized to line up the seeds in single file to meter the seeds to inhibit multiple seeds from entering the bore hole 278 at the same time.

The bore hole 278 extends vertically through the seed guide 250 and receives a reciprocating shaft 246. A lower portion 286 of the reciprocating shaft 246 is shaped to correspond to the seed shape. In the illustrated embodiment, the lower portion 286 is curved and generally circular. In other embodiments, the lower portion 286 is any of a variety of suitable shapes configured to engage the seed to be planted. The illustrated reciprocating shaft 246 is hollow, but the reciprocating shaft 246 can be solid in some embodiments. In some embodiments, a vacuum source is coupled to the hollow reciprocating shaft 246 to selectively create a vacuum to retain the seed on the lower portion 286 of the reciprocating shaft 246 while the reciprocating shaft 246 is moving downward. While the reciprocating shaft 246 is moving upward, the vacuum source can be temporarily deactivated to permit the seed to separate from the lower portion 286 of the reciprocating shaft 246. In some embodiments, a fertilizer, pesticide or other suitable fluid is delivered to the seed through the hollow reciprocating shaft 246. In some embodiments, the lower portion 286 of the reciprocating shaft 246 includes a flexible material to conform to the shape of the seed.

The illustrated seed retainer 280 is a flexible member that extends into the bore hole 278 while the reciprocating shaft 246 is in the raised position (shown in FIG. 6). The seed retainer 280 retains one seed S5 in the bore hole 278 while the reciprocating shaft 246 is in the raised position. The seed retainer 280 is deformed by the seed S5 and the reciprocating shaft 246 moving downward to the ground 292 (see FIG. 7). The seed retainer 280 remains deformed by the reciprocating shaft 246 as the reciprocating shaft 246 moves upward (see FIG. 8). The seed retainer 280 resumes the undeformed shape when the reciprocating shaft 246 approaches the raised position (see FIG. 6). While the seed retainer 280 is deformed, the seed S6 abuts the reciprocating shaft 246 to inhibit the seed S6 from entering the bore hole 278.

The vacuum port 284 can be connected to a vacuum source to draw the seeds (i.e., S5, S6 etc.) toward the bore hole 278 and the seed retainer 280. The vacuum port 284 can be utilized in addition to gravity to move the seeds into the planting position.

The illustrated fluid ports 288a, 288b, 288c are possible locations for fertilizer, pesticide, or other suitable fluid to be moved into the ground 292 along with the seed. The fluid port 288a delivers the liquid into the bore hole 278 above the seed. The fluid port 288b delivers the liquid into the bore hole 278 proximate the seed. The fluid port 288c delivers the liquid into the bore hole 278 proximate a lower portion of the bore hole 278. In some instances, only one or two of these fluid ports are utilized. In some configurations, fluid ports are positioned in other suitable locations, such as directly adjacent the seed.

FIGS. 9 and 10 illustrate an alternative configuration of a seed guide 350. The seed guide 350 can be used in place of the seed guide 50 described above with respect to FIGS. 2-5. The seed guide 350 includes a curved channel 374, a bore hole 378, a seed retainer 380, a vacuum port 384 and fluid ports 388a, 388b, 388c. The curved channel 374, the bore hole 378, the vacuum port 384 and the fluid ports 388a, 388b, 388c are similar to the corresponding elements shown in FIGS. 6-8 and will not be described in detail for brevity.

The illustrated seed retainer 380 is a spring that extends into the bore hole 378 while a reciprocating shaft 346 is in the raised position (shown in FIG. 9). The seed retainer 380 retains one seed S7 in the bore hole 378 while the reciprocating shaft 346 is in the raised position. The seed retainer 380 is deformed by the seed S7 and the reciprocating shaft 346 moving downward toward the ground (see FIG. 10). The seed retainer 380 remains deformed by the reciprocating shaft 346 as the reciprocating shaft 346 moves upward. The seed retainer 380 resumes the undeformed shape when the reciprocating shaft 346 approaches the raised position (see FIG. 9). While the seed retainer 380 is deformed, the seed S8 abuts the reciprocating shaft 346 to inhibit the seed S8 from entering the bore hole 378.

Figure 11:
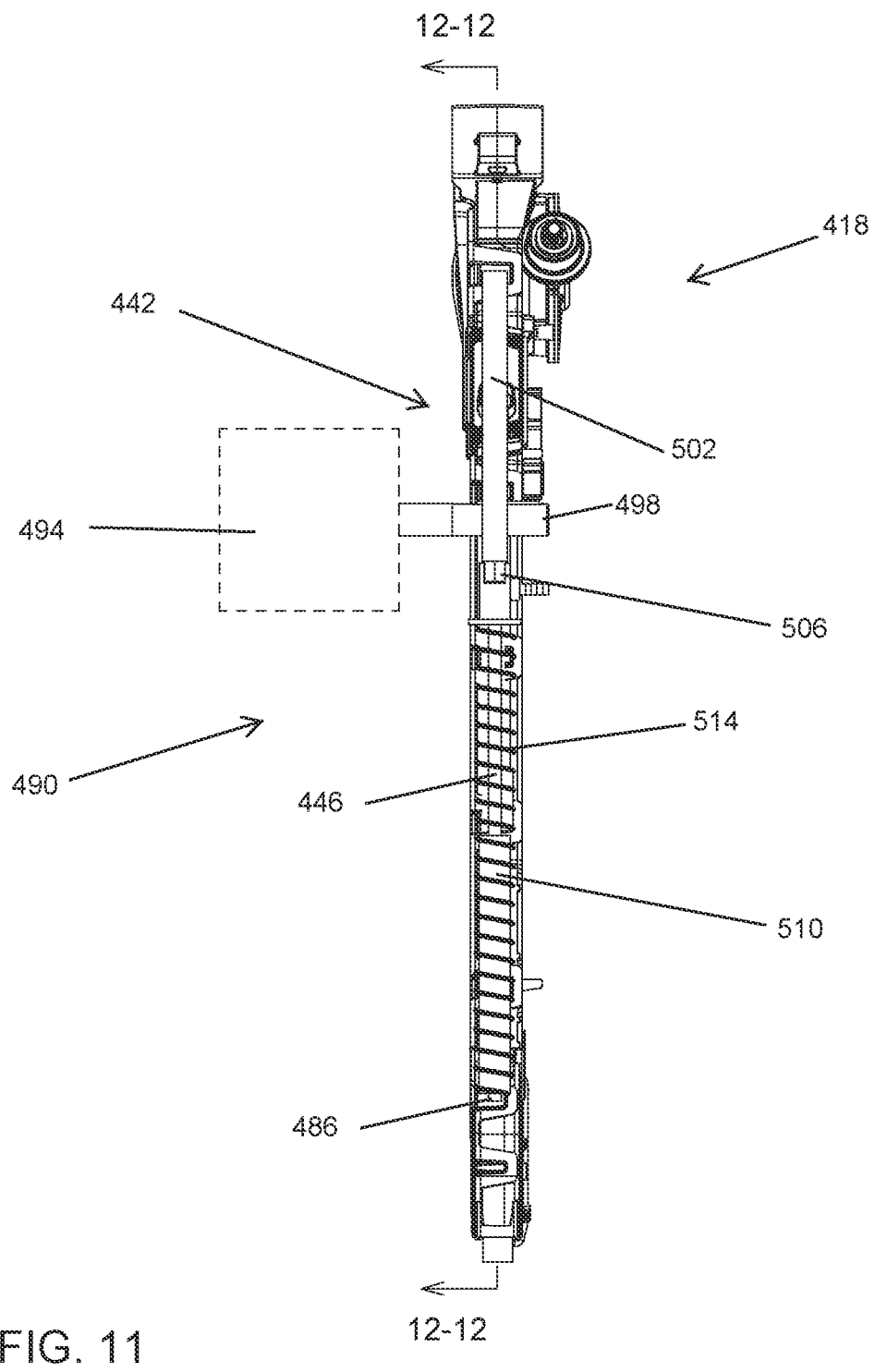
FIG. 11 is a front view of an alternative embodiment of a seed metering device with the shaft in a raised position.
Figure 12:
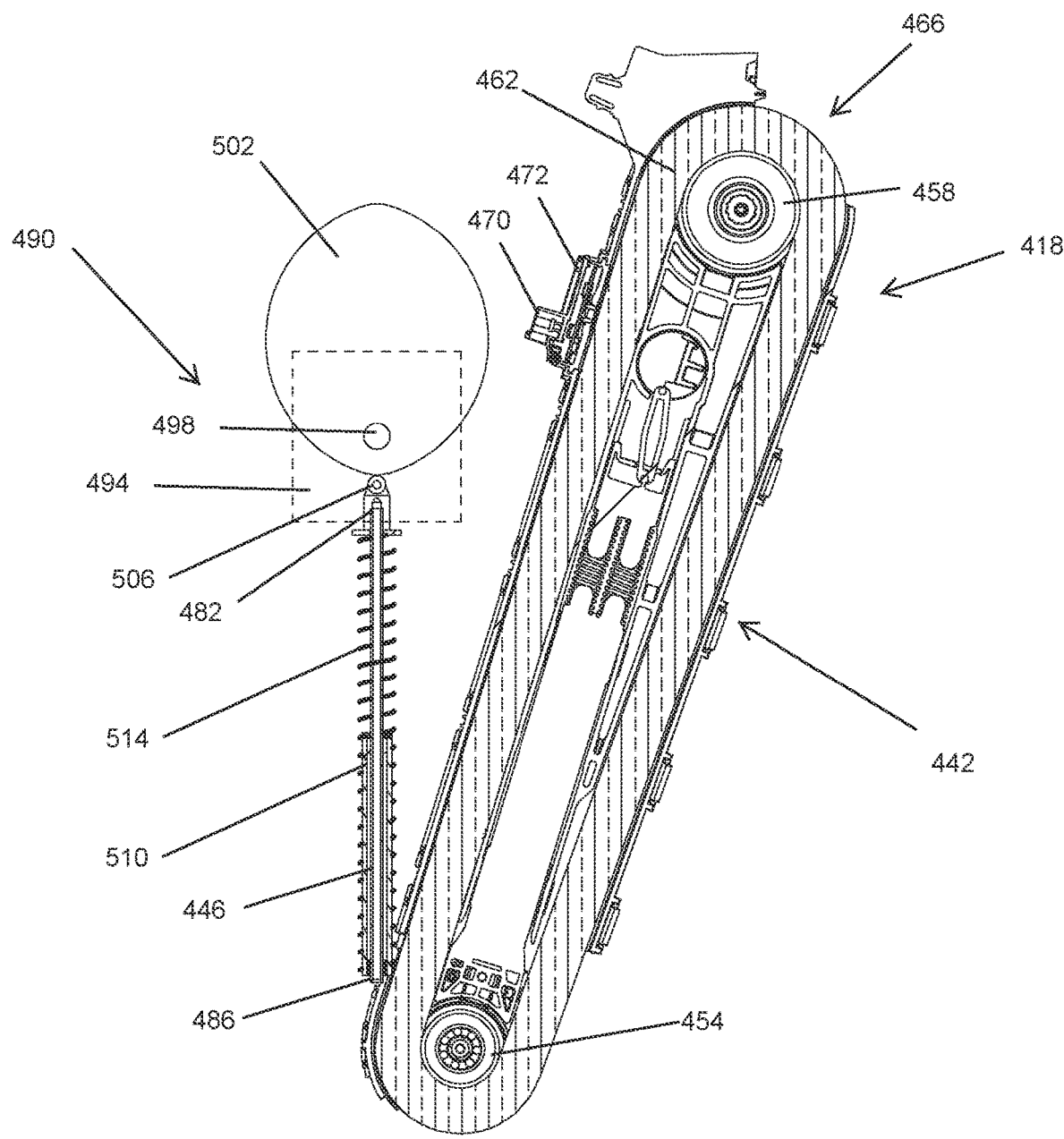
FIG. 12 is a cross-sectional view taken along line 12-12 of FIG. 11 with the shaft in a raised position.
Figure 13:
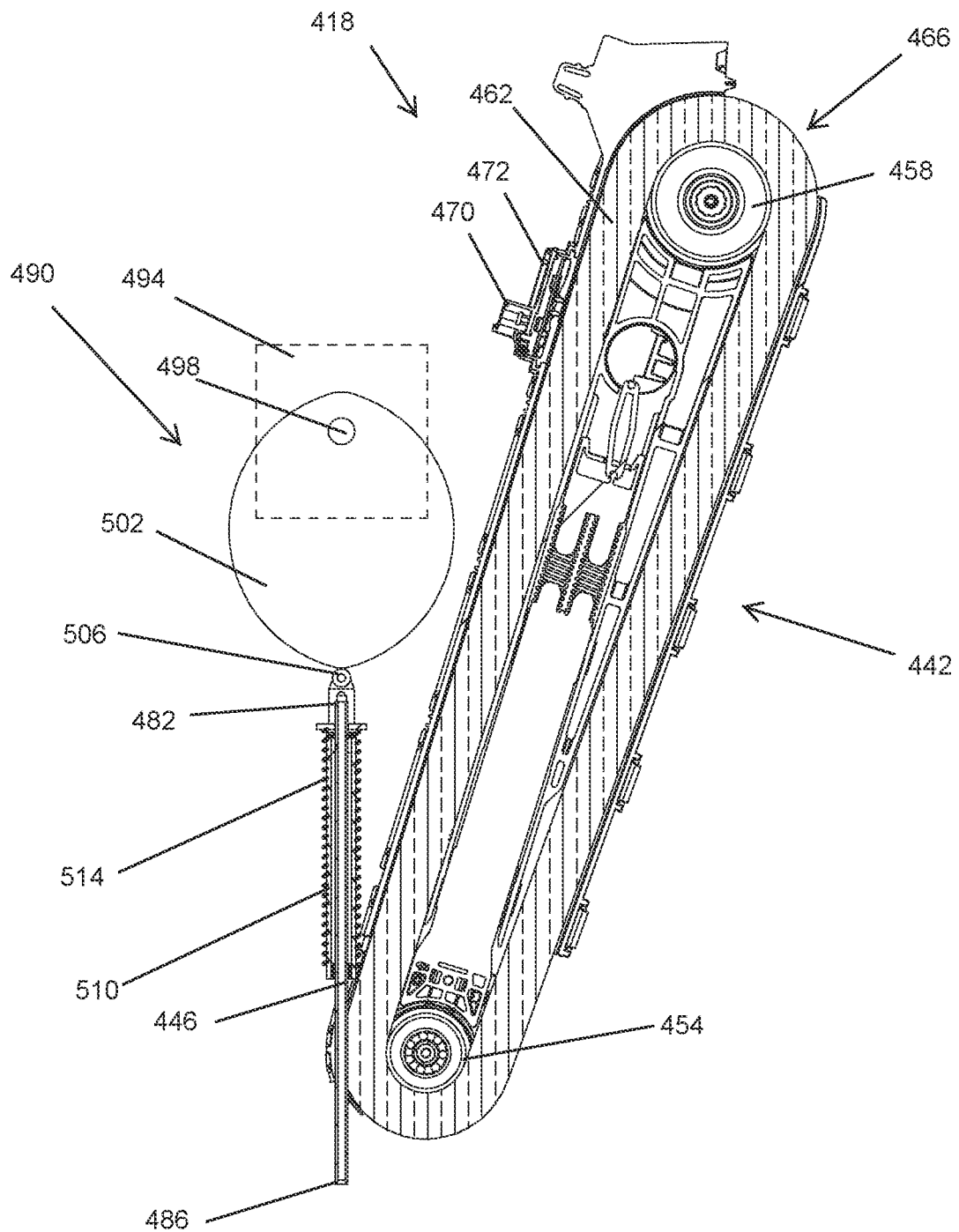
FIG. 13 is a cross-sectional view taken along line 12-12 of FIG. 11 with the shaft in a lowered position.

FIGS. 11-13 illustrate an alternative configuration of a planting row unit 418 that can be utilized with the planter 10 shown in FIG. 1. The illustrated planting row unit 418 includes a seed metering device 442 and a reciprocating shaft 446. The seed metering device 442 (shown most clearly in FIGS. 12 and 13) includes a first rotating member 454, a second rotating member 458, endless member 462, a seed input port 466, a seed sensor 470, and an endless member sensor 472.

The first rotating member 454, the second rotating member 458, the endless member 462 and the seed input port 466 are similar to the corresponding elements shown in FIGS. 2-5 and will not be described in detail for brevity.

The seed sensor 470, like the seed sensor 70, is configured to sense the proximate or presence of individual seeds on or near the endless member 462. FIGS. 12 and 13 illustrate the seed sensor 470 positioned near an upper portion of the endless member 462. In other configurations, the seed sensor 70 could be positioned in other locations. The seed sensor 70 could be any suitable sensor capable of sensing the position of a seed and communicating the sensed position to the controller 34.

The spacing between adjacent seeds can be controlled by adjusting a speed of movement of the endless member 462 and by any seed metering mechanism that is upstream of the seed metering device 442. The endless member sensor 472 is configured to sense one or more parameters indicative of a speed of the endless member 462. For example, the endless member sensor 472 can be configured to sense a linear speed of the endless member 462, to sense a rotational speed of one of the rotating members 454, 458, and/or to sense a time interval between dispensed seeds. The endless member sensor 472 is configured to communicate the sensed parameter(s) with the controller 34. In embodiments that sense the rotational speed of one of the rotating members 454, 458 the controller 434 is configured to calculate the linear speed of movement of the endless member 462 based upon the sensed rotational speed. In embodiments that to sense a time interval between dispensed seeds, the controller 34 can then determine the desired speed of the endless member 462, among other factors, to achieve a predetermined target seed spacing.

With continued reference to FIGS. 11-13, the reciprocating shaft 446 is an elongate, hollow shaft with an upper portion 482 and a lower portion 486. The first portion 482 is coupled to a drive mechanism 490 and the second portion 486 is a free end.

The illustrated drive mechanism 490 includes a motor 494, a cam shaft 498, a cam 502, a cam follower 506, a sleeve 510 and a spring 514. The drive mechanism 490 operates in a similar manner to the drive mechanism 90 of FIGS. 2-5. The drive mechanism 490 causes the reciprocating shaft 446 to reciprocate vertically with respect to a frame, such as the frame 14 of FIG. 1, through a stroke path including extension towards the ground to a lowered position (shown in FIG. 13) and retraction away from the ground to a raised position (shown in FIGS. 11 and 12). In some examples, reciprocating shaft 446 may operate at an angle other than vertical with respect to the frame.

As shown in FIG. 12, while the reciprocating shaft 446 is near the raised position, the reciprocating shaft 446 is positioned just above the endless member 462. As the reciprocating shaft 446 moves downward in response to the drive mechanism 490, the second portion 486 engages a seed in the planting position from the endless member 462. The planting position is the location in which the seed conveyed by the endless member 462 generally intersects the path of the reciprocating shaft 446. The reciprocating shaft 446 continues to move downward in response to the drive mechanism 449 until the reciprocating shaft 446 and seed pierce the ground to create an opening in the ground. The reciprocating shaft 446 inserts the seed into ground to plant the seed while the reciprocating shaft 446 is near the lowered position.

Figure 14:
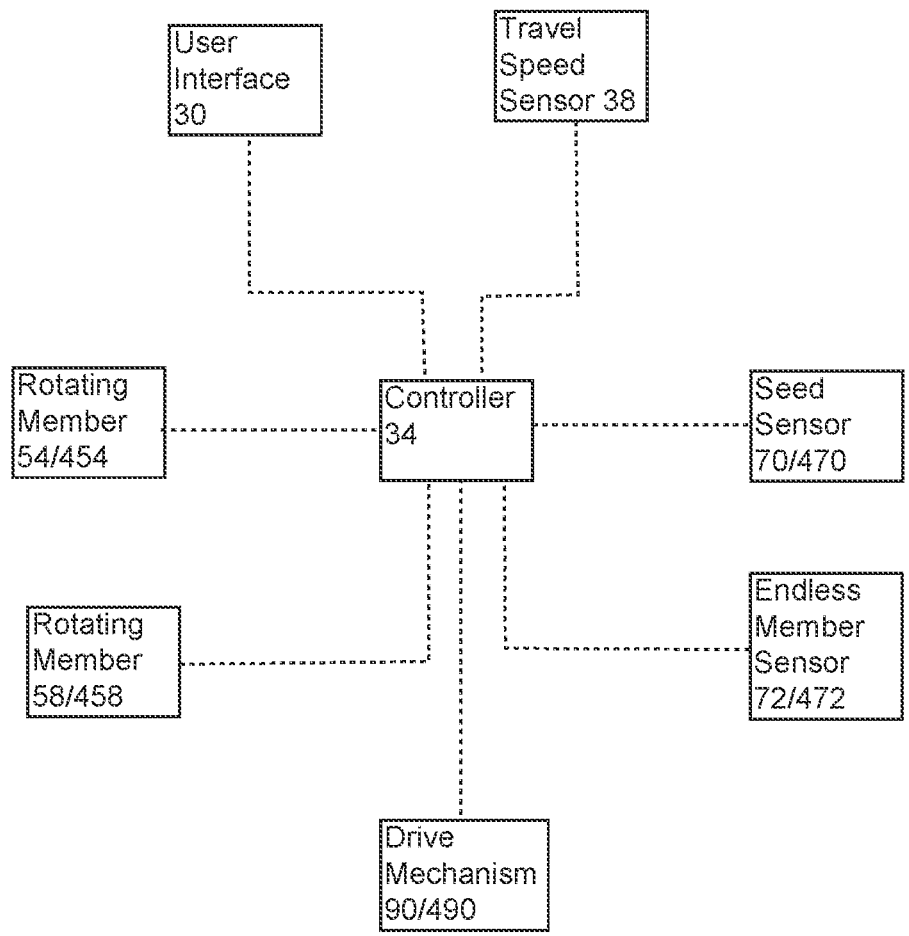
FIG. 14 is a schematic view of a control system.

As shown in FIG. 14, the controller 34 is in electrical communication with the user interface 30, the travel speed sensor 38, the rotating members 54/58, 454/458, the seed sensor 70, 470, the endless member sensor 72, 472, and the drive mechanism 90, 490. The travel speed sensor 38 senses the travel speed of the planter 10 and communicates the sensed travel speed with the controller 34. In some embodiments, the speed of movement of the endless member 62, 462 is controlled based upon the travel speed of the planter 10. The seed sensor 70, 470 senses the presence and/or position of each of the seeds on the endless member 62, 462 and communicates the sensed presence/position of each of the seeds to the controller 34. The endless member sensor 72, 472 senses a linear speed of movement of the endless member 62, 462, a rotational speed of at least one of the rotating members 54/58, 454/458, and/or a time interval between adjacent seeds on the endless member 62, 462. The parameter(s) sensed by the endless member sensor 72, 472 are communicated to the controller 34.

The controller 34 is configured to use one or more of the parameters sensed by the travel speed sensor 38 and the endless member sensor 72, 472 to determine the speed of movement of the endless member 62, 462. The controller 34 is configured to determine a desired speed of movement of the endless member 62, 462 based at least in part upon the target population of seeds, the row width, a speed of the singulator that meters the seeds onto the endless member 62, 462, as well as the geometry of the endless member 62, 462.

The user interface 30 can be engaged by a user to set various parameters, such as a desired seed population (e.g., plants per acre), and type of seed being planted. The controller 34 receives the input from the user interface 30 and determined the desired interseed spacing (e.g., distance between seeds planted by the same planting row unit 18) based upon the designed seed population set by the user and the distance between adjacent planting row units 18.

After the controller 34 receives input via the sensors 38, 70/470, 72/472 and the user interface, the controller 34 determines the desired frequency or timing of cycling the reciprocating shaft 46, 446 based on the travel speed of the planter 10 and the target seed spacing set by the user via the user interface 30. The controller 34 communicates the with the reciprocating shaft 46, 446 to adjust the cycling frequency or timing to the desired frequency or timing.

The controller 34 is in electrical communication with the first and/or second rotating members 54, 58, 454, 458 to send signals to cause adjustment of the speed at which the endless member 62, 462 moves around the rotating members 54, 58, 454, 458.

After the controller 34 receives input via the travel speed sensor 38 and the seed sensor 70, 470, the controller 34 determines the desired speed of movement of the endless member 62, 462 as well as the desired frequency or timing of cycling the reciprocating shaft 46, 446 which is controlled by the drive mechanism 90, 490. The controller 34 synchronizes the seed of movement of the endless member 62, 462 and the desired frequency or timing of cycling the reciprocating shaft 46, 446 such that the reciprocating shaft 46, 446 is near the raised position while the seed is positioned to be engaged by the reciprocating shaft 46, 446.

In the illustrated embodiment, the timing and frequency of cycling of the reciprocating shaft 46, 446 are controlled. The reciprocation frequency may be calculated as the number of shaft extension/retraction cycles in a given unit of time. The timing of the reciprocating shaft 46, 446 is controlled to be synchronized with the position of the seeds on the endless member 62, 462. While timing and frequency are related, either or both can be controlled by the controller 34.

In order to achieve the target spacing, the controller 34 uses the sensed speed of the planter 10 to control the seed feed rate and, if present, the speed of the endless member 62, 462, and/or the time interval between adjacent seeds on the endless member 62, 462. In some embodiments, each of the planting row units 18 is separately controlled. In some embodiments, the timing of the seed arriving in the ground is managed across planting row units 18 to coordinate timing of planting between row units 18. By coordinating timing, the seeds can be planted in a pattern, such as a grid pattern, a diamond pattern, a checkerboard pattern, or other desirable pattern. Additionally, multiple seeds can be planted (i.e., in an alternating pattern) to interplant different seeds.

In some configurations, two or more rows of planting units 18 are coupled to the planter 10. In some of these configurations, the first row is coupled to one of the hoppers 22 to receive a first type of seed and the second row is coupled to another one of the hoppers 22 to receive a second type of seed. In other of these configurations, alternating planting units 18 in the first row of coupled to different hoppers 22 to permit two different types of seeds to be planted in a checkerboard pattern. Other arrangements and configurations of planting row units 18 (i.e., in multiple rows or coupled to differing hoppers 22) are contemplated and the examples provided herein are only some of the possible configurations.

If pattern planting is being done, then the controller 34 compares seed location information between each of the planting row units 18 such that the controller 34 can send appropriate output signals to synchronize the location of seeds on the endless members 62, 462 to achieve the pattern. One possible way to achieve such synchronization is to briefly vary the speed of some of the endless members 62, 462.

Various features of the disclosure are set forth in the following claims.

What is claimed is:

1. A planter for planting seeds in the ground, the planter comprising:
    a frame;
    a seed metering device configured to separate and guide individual seeds into a planting position; and
    a shaft configured to reciprocate with respect to the frame through a stroke path including extension towards the ground to a lowered position and retraction away from the ground to a raised position, the shaft configured to engage one of the seeds from the planting position while the shaft is near the raised position, to move the one of the seeds downward while the shaft extends toward the ground, and to create an opening in the ground by inserting the one of the seeds into ground while the shaft is near the lowered position,
    wherein the seed metering device includes an endless member extending around a drive member, the drive member configured to move the endless member around the drive member, and
    wherein the shaft is configured to engage the one of the seeds while the one of the seeds is in the planting position on the endless member.

2. A planter for planting seeds in the ground, the planter comprising:
    a frame;
    a seed metering device configured to separate and guide individual seeds into a planting position;
    a shaft configured to reciprocate with respect to the frame through a stroke path including extension towards the ground to a lowered position and retraction away from the ground to a raised position, the shaft configured to engage one of the seeds from the planting position while the shaft is near the raised position, to move the one of the seeds downward while the shaft extends toward the ground, and to create an opening in the ground by inserting the one of the seeds into ground while the shaft is near the lowered position
    a passage sized to fit the seeds in single file; and
    a retainer configured to retain the one of the seeds in the planting position, the retainer configured to be deformed by the shaft while the shaft moves the one of the seeds downward into the ground, and a sleeve positioned around the shaft, and a fluid port positioned to direct fluid into the sleeve such that the fluid is moved downward with the one of the seeds into the ground in response to downward movement of the shaft.

3. A planter for planting seeds in the ground, the planter comprising:
    a frame;
    a seed metering device configured to separate and guide individual seeds into a planting position, the seed metering device including an endless member extending around a drive member, the drive member configured to move the endless member around the drive member;
    a seed guide positioned to receive the one of the seeds from the endless member and to move the one of the seeds into the planting position; and
    a shaft configured to reciprocate with respect to the frame through a stroke path including extension towards the ground to a lowered position and retraction away from the ground to a raised position, the shaft configured to engage one of the seeds from the planting position while the shaft is near the raised position, to move the one of the seeds downward while the shaft extends toward the ground, and to create an opening in the ground by inserting the one of the seeds into ground while the shaft is near the lowered position.

4. The planter of claim 1, further comprising a first sensor configured to sense a parameter indicative of a speed of movement of the endless member,
    a second sensor configured to sense a position of the seeds on an endless member of the seed metering device, the endless member extending around a drive member, the drive member configured to move the endless member around the drive member, and
    a controller in electrical communication with the seed metering device, the shaft, the first sensor and the second sensor, the controller configured to
        receive a first signal from the first sensor, the first signal indicative of the speed of movement of the endless member,
        receive a second signal from the second sensor, the second signal indicative of the position of the seeds on the endless member,
        send a third signal to the shaft to cause a reciprocation timing of the shaft to be adjusted in response to the first and second signals, and
        send a fourth signal to the drive member to cause a speed of movement of the endless member to be adjusted in response to the first and second signals.

5. The planter of claim 4, wherein the controller is further configured to send a fourth signal to the drive member to cause a speed of movement of the endless member to be adjusted in response to the first and second signals.

6. A seeding machine configured to be moved over the ground, the seeding machine comprising:
a frame;
at least one hopper containing seeds to be planted; and
a plurality of planting row units coupled to the frame, each of the planting row units including
a seed metering device configured to separate and guide individual seeds into a planting position, and
a shaft configured to reciprocate with respect to the frame through a stroke path including extension towards the ground to a lowered position and retraction away from the ground to a raised position, the shaft configured to engage one of the seeds from the planting position while the shaft is near the raised position, to move the one of the seeds downward while the shaft extends toward the ground, and to create an opening in the ground by pressing the one of the seeds into ground while the shaft is near the lowered position,
wherein a first portion of the plurality of planting row units are positioned to form a first row of planting row units extending substantially perpendicular to a direction of travel of the seeding machine and a second portion of plurality of planting row units are positioned to form a second row of planting units extending substantially parallel to the first row of planning units and positioned rearwardly of the first row of planting units in the direction of travel of the seeding machine.

7. The seeding machine of claim 6, further comprising a first sensor configured to sense a parameter indicative of a speed of movement of the endless member;
a second sensor configured to sense a position of one of the seeds on an endless member of one of the seed metering devices, the endless member extending around a drive member; and
a controller in electrical communication with each of the planting row units, the first sensor and the second sensor, the controller configured to
receive a first signal from the first sensor, the first signal indicative of the speed of movement of the endless member,
receive a second signal from the second sensor, the second signal indicative of the position of one of the seeds on the endless member,
send a third signal to the shaft to cause a reciprocation timing of the shaft to be adjusted in response to the first and second signals.

8. The seeding machine of claim 6, wherein the seed metering device of each of the plurality of planting units includes an endless member extending around a drive member, the drive member configured to move the endless member around the drive member, and
wherein the shaft is configured to engage the one of the seeds while the one of the seeds is in the planting position on the endless member.

9. The seeding machine of claim 6, wherein the seed metering device of each of the plurality of planting units includes an endless member extending around a drive member, the drive member configured to move the endless member around the drive member, and further comprising a seed guide positioned to receive the one of the seeds from the endless member and to move the one of the seeds into the planting position.

10. The seeding machine of claim 6, further comprising a passage sized to fit the seeds in single file, and a retainer configured to retain the one of the seeds in the planting position, the retainer configured to be deformed by the shaft while the shaft moves the one of the seeds downward into the ground.

11. A control system for a seeding machine including a frame, a hopper configured to retain seeds, and a seed metering device having a drive member, and an endless member, and a reciprocating shaft, the drive member configured to move the endless member about the drive member, the reciprocating shaft configured to reciprocate with respect to the frame through a stroke path including extension towards the ground to a lowered position and retraction away from the ground to a raised position, the shaft configured to engage one of the seeds from the endless member while the shaft is near the raised position, to move the one of the seeds downward while the shaft extends toward the ground, and to press the one of the seeds into ground to thereby create an opening in the ground while the shaft is near the lowered position, the control system comprising:
a first sensor configured to sense a parameter indicative of a speed of the endless member;
a second sensor configured to sense a position of a seed on the endless member; and
a controller in electrical communication with the first sensor and the second sensor, the controller configured to
receive a first signal from the first sensor, the first signal indicative of the speed of the endless member,
receive a second signal from the second sensor, the second signal indicative of the position of the seeds on the endless member,
send a third signal to the shaft to cause a reciprocation timing of the reciprocating shaft to be adjusted in response to the first and second signals.

12. The control system of claim 11, further comprising a user interface permitting a user to select one or more seeding parameters, the user interface in electrical communication with the controller,
wherein the controller is configured to determine a desired seed spaced based at least in part upon the one or more seeding parameters selected by the user,
wherein the controller is configured to receive a fifth signal from the user interface, the fifth signal indicative of the desired seed spacing, and
wherein the controller is configured to determine a target reciprocation timing of the reciprocating shaft and the target speed of movement of the endless member based at least in part on the fifth signal.

13. The control system of claim 11, wherein the controller is further configured to determine a desired timing of the reciprocating shaft such that the reciprocating shaft is near the raised position while the seed is positioned to be engaged by the reciprocating shaft, and
send a fourth signal to the drive member to cause a speed of movement of the endless member to be adjusted in response to the first and second signals.

* * * * *

UNITED STATES PATENT AND TRADEMARK OFFICE
CERTIFICATE OF CORRECTION

PATENT NO. : 12,356,884 B2
APPLICATION NO. : 17/743082
DATED : July 15, 2025
INVENTOR(S) : Mark E. Barker et al.

Page 1 of 1

It is certified that error appears in the above-identified patent and that said Letters Patent is hereby corrected as shown below:

In the Claims

On Column 11, Line 30, Claim 6, replace "planning" with --planting--

Signed and Sealed this
Eighteenth Day of November, 2025

John A. Squires
*Director of the United States Patent and Trademark Office*